Oct. 11, 1927. 1,645,449
D. W. PROEBSTEL
MULTIPLE PITOT AND PIEZOMETER TUBE FOR MEASURING THE FLOW OF WATER THROUGH CLOSED CONDUITS
Filed May 25, 1925    2 Sheets-Sheet 1

Inventor
Delbert W. Proebstel
By his
Attorney

Oct. 11, 1927.
D. W. PROEBSTEL
1,645,449
MULTIPLE PITOT AND PIEZOMETER TUBE FOR MEASURING THE FLOW OF WATER THROUGH CLOSED CONDUITS
Filed May 25, 1925   2 Sheets-Sheet 2
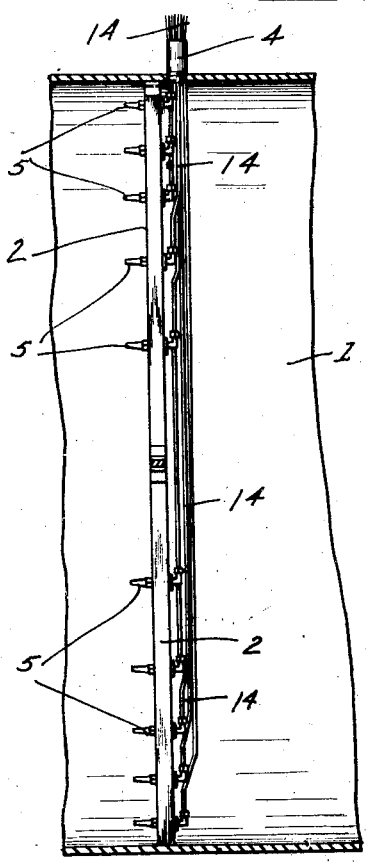
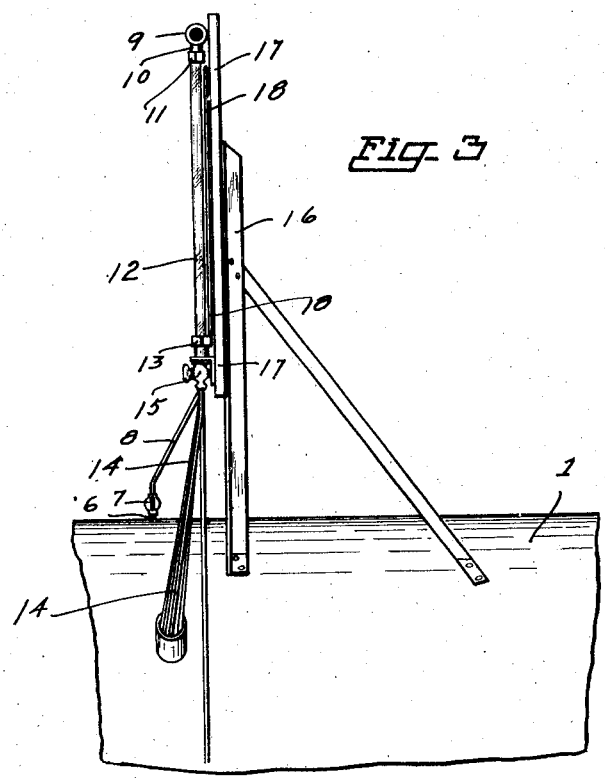
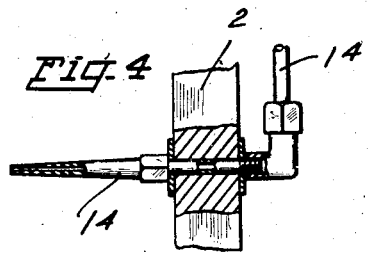
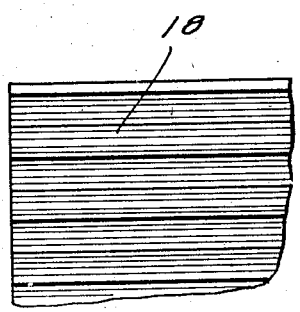
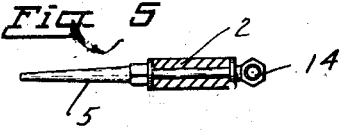
Inventor
Delbert W. Proebstel
By his
Attorney Patented Oct. 11, 1927.

1,645,449

UNITED STATES PATENT OFFICE.

DELBERT W. PROEBSTEL, OF PORTLAND, OREGON.

MULTIPLE PITOT AND PIEZOMETER TUBE FOR MEASURING THE FLOW OF WATER THROUGH CLOSED CONDUITS.

Application filed May 25, 1925. Serial No. 32,801.

My invention relates to an improved means of accurately determining the quantity of flow of water through closed conduits.

The development of central station hydroelectric plants of great magnitude and of immense proportions has created the necessity for the accurate determining of the quantity of water flowing past a given point in the conduit.

In the developments where these conduits are of large diameters, the determination of the flow through the conduit, may only be accomplished, by taking representative readings over a number of points in the conduit at one time.

Heretofore, only representative readings have been made, and when so made, have been made at different intervals, wherein different conditions may be existent within the conduit, or where currents or eddies may change the velocity of the stream flow through the conduit under the same operating conditions in different parts of the area, of the conduit, at the same time.

With my improvement I have made possible the taking of instantaneous readings over a conduit area, and have devised a means through the utilization of the camera, for recording these instantaneous readings for future determinations of the existent condition over the different areas within the conduit, at the time made. From the permanent record made through the use of the camera in recording the condition existent within the stream flow, at the time the reading was made, the quantity flow may be determined.

In my invention, I utilize many fixed Pitot nozzles placed within the area of the closed conduit, maintaining the same in fixed position upon a cross frame, placed normal to the longitudinal axis of the conduit; they are so placed that each one is at the center of an equal segment area of concentric rings, each segment, representing a divisional unit, such as one-fourth of one of the concentric bands or rings. These Pitot nozzles and the piezometer tubes are connected to a glass tube manometer by means of small tubes. The glass tubes terminate in a manifold at the top of the same, which is arranged so that a compressible fluid may be used, as air, to force the water column in the tubes down to where they can be read on a gauge board. I then place behind the manometer tube, a chart that I have carefully prepared in advance, and divided into uniform measurements, as tenths, and hundredths of a foot. This chart is adjusted, so that the lines are accurately horizontal. This is quite important, inasmuch as the velocity heads, in feet, may be recorded and read directly from the chart. A greater visibility may be obtained by the placing, in the tubes and in the manifold, of a fluid containing color pigments, this may be applied within the compressible fluid or within the water itself.

After the location of the device has been fixed and the chart placed behind the tubes, compressed air is then applied within the manifold, to force the pressure lines down to where a reading may be made, indicative of the pressures caused by the flow of water in the conduit. A camera having been previously set in position, and directly in front of the device for photographing the tubes and chart, a photograph may be then made to secure a permanent record of the results, indicated on each water glass, caused by the velocity head within the conduit. This enables the operator to obtain an instantaneous reading of the pressure head, and the combined pressure, and velocity heads of an entire cross sectional area of the conduit, wherein the actual reading shown, is indicative of the heads at the center of the area segments. The velocity head, will be the difference between the reading of the Pitot tube and the average of the readings of the piezometer tubes.

The tabulation and the curve which follow indicate all the work that is necessary to determine the flow of water in C. F. S. The velocity V in feet per second is calculated from the formula $V = (2gh)^{\frac{1}{2}}$, where $h$ is the velocity head in feet and $g$ the acceleration due to gravity. The velocity values are plotted as ordinates with their corresponding cross-sectional areas as abscissa. The curve which results is called a flow curve. Its area is proportional to the flow of water through the conduit.

With these and incidental objects in view, the invention consists in certain novel features of construction and combination of parts, the essential elements of which are set forth in the appended claims and to a preferred form of embodiment of which is hereinafter shown with reference to the drawings which accompany and form a part of this specification.

In the drawings:—

Fig. 2 is a side elevation, taken on line 2—2 of Fig. 1, looking in the direction indicated.

Fig. 3 is a fragmentary side elevation of the upper portion of the device, shown in position upon the conduit, and the location of the gauge-board placed behind the same.

Fig. 4 is a partial, sectional, side elevation of a Pitot tube of the type I have found that gives the best results, in position upon the supporting bar for the same.

Fig. 5 is an end view of the frame support for the Pitot tubes partially in section and shows the Pitot tube in position.

Fig. 6 is a fragmentary front view of the chart made to illustrate one form of line graduation placed thereupon.

Like reference characters refer to like parts throughout the several views:—

Figure 1:
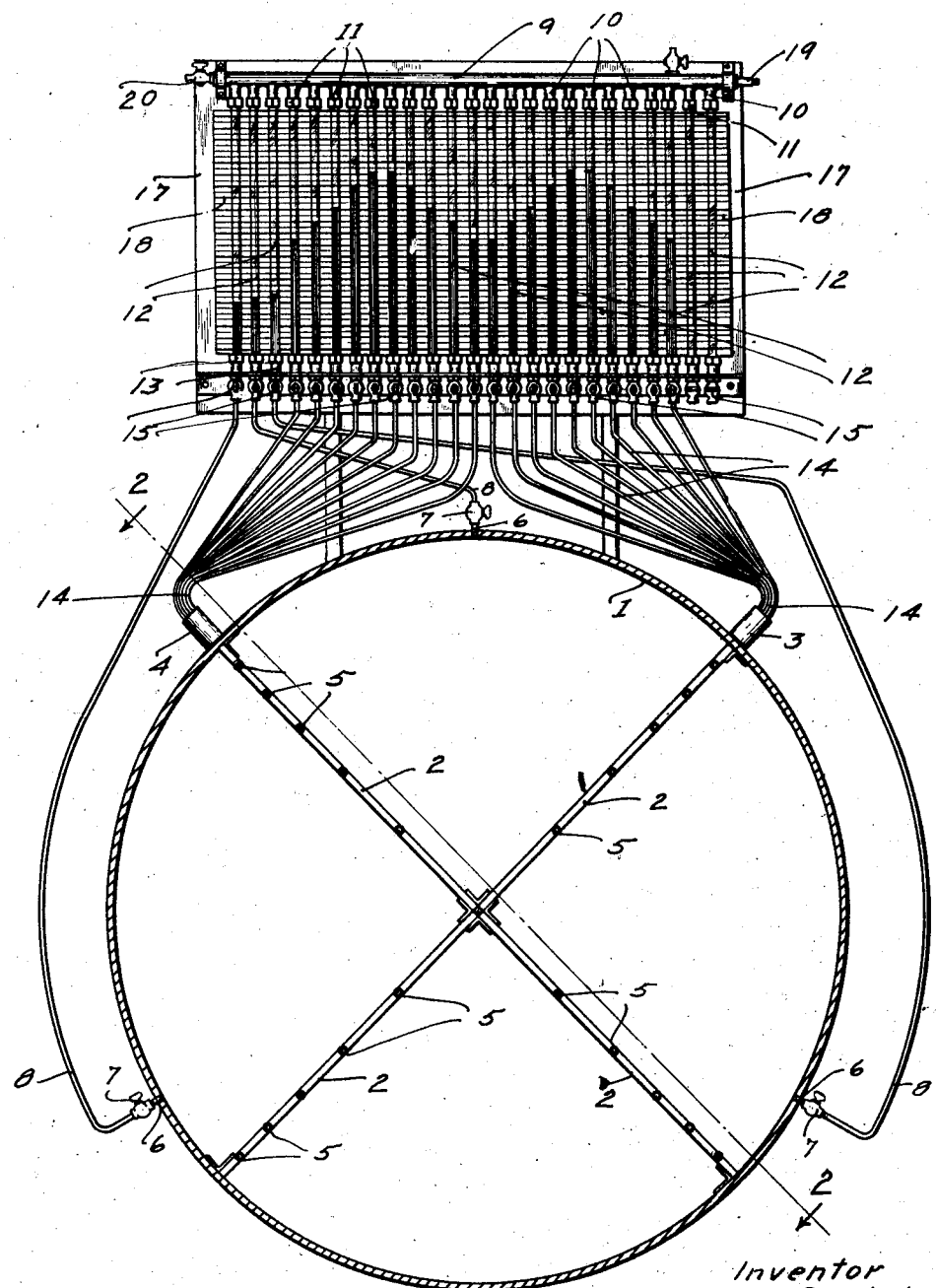
Fig. 1 is a cross sectional view of a large conduit, illustrating my device in place upon and in the conduit ready for making the determinations of a representative flow over the entire area.

1 is the pipe conduit, which is made of steel or wood or other suitable material, depending upon the location of the same, the size and the head under which the same is being used, and 2 are the frame supports here shown as four in number, which are radially mounted within the conduit 1. Sealed pipes 3 and 4 are placed upon the conduit, through which the pipes 14 are conducted into the interior of the conduit, the outer ends of which are connected up as will be explained later. Pitot tubes 5, are mounted upon the radial supports 2, parallel to the axis of the conduit, their spacing and location depending upon the shape and diameter of the conduit itself. Each of the Pitot tubes 5 is connected to the inner end of one of the pipes 14, as shown in Fig. 2. Piezometer tubes 6, are mounted through the conduit and have suitable shut-off cocks 7, which are located exteriorly of the wall of the conduit, and which are to prevent the passage of water therethrough, during the preparation of the equipment and during the placement of the remainder of the equipment. Pipes 8, are then connected therefrom to glass tubes located upon the gauge.

On the exterior of the conduit 1, I have mounted the supporting frame 16, which has the chart 18 and support board 17 mounted thereon. Adjacent the upper edge of the chart board is disposed the manifold 9, the axis of which is at a right angle to the vertical. On the underside of the manifold 9 are formed a series of openings 10, the purpose of which will appear later. Along the lower edge of the chart 18 board are mounted a series of pet cocks 15, there being the same number of pet cocks as there are openings 10 in the manifold 9, the pet cocks are arranged vertically on the chart board so that the upper opening of each is disposed opposite a corresponding opening 10 in the manifold 9. Between the upper openings of the pet cocks 15 and the opening 10 of the manifold are disposed the glass tubes 12 which form a means for fluid flow between the manifold and the pet cocks. A proper liquid tight packing is maintained between the glass tubes and the openings in the manifold, and the pet cocks by means of the packing glands 11 and 13. When the glass tubes are so mounted to the chart board, they are arranged in a plane parallel to the plane of the largest surface of the board. The tubes 12 are spaced apart from the chart board to permit the chart 18 to be secured to the board between it and the tubes.

The outer ends of the pipes or tubes 14 are each connected to the lower end of a pet cock 15, which will permit the flow of a fluid from Pitot tube 5 through the pipe 14, the glass tube 12 to the manifold 9.

Mounted through the wall of the conduit 1 are piezometer tubes 6, which have mounted on their outer ends shut off cocks 7. Each of the shut off cocks 7 of the piezometer tubes 6, is connected by means of pipes or tubes 8 to a pet cock 15 to permit the flow of a fluid therethrough, to or toward the manifold 9.

An air valve 19 is disposed at one end of the manifold 9 to permit air under pressure to be forced into the manifold. The air may be forced in either by a power driven compressor or an ordinary hand pump. The compressed air is introduced for the purpose of lowering the water column in each of the glass tubes so that the height of each water column may be noted in reference to the markings on the chart 18. In the event the air pressure is too great to permit the lowest of the water columns to be read, the pressure of the air may be lessened by means of the pet cock 20 disposed on the manifold, and the lessening of the air pressure in the tubes and manifold will of course permit the water columns to rise in each of the glass tubes. The pet 20 cock may also be used for the purpose of introducing a colored liquid which may top or rest upon the water column in each of the glass tubes, the purpose of which is to permit greater ease in reading the height of the water in regard to the chart. Or, again, dry or other coloring matter may be introduced to the water columns for the purpose of making the same show out more distinctly against the chart in the background.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow:

1. A multiple Pitot and piezometer tube for measuring the flow of water through closed conduits, comprising a frame work extending across the conduit and at right angles to the longitudinal axis of the conduit, a plurality of Pitot tube nozzles secured in said frame work, said Pitot tubes having their axes parallel to the axis of the conduit; transparent tubes parallelly disposed and vertically mounted exteriorly of said conduit; tubes connecting the Pitot tubes with the lower ends of said parallelly arranged transparent tubes; and a manifold disposed on and communicating with the free end of the said transparent tubes and adapted to the admission of a compressible fluid therein for depressing the liquid in said tubes to normal working position.

2. A multiple Pitot and piezometer tube for measuring the flow of water through closed conduits, comprising a radial frame mounted within a conduit; Pitot tubes mounted within said frame and having the axes of their nozzles disposed parallel to the axis of the conduit; a plurality of transparent tubes vertically disposed exteriorly of the conduit; pipes connecting the Pitot tubes with the lower ends of the transparent tubes; a chart support associated with said transparent tubes; and a cylindrical member mounted upon and communicating with the upper ends of said transparent tubes, and adapted to the admission of a compressible fluid therein for depressing the liquid in said tubes to normal working position.

3. A multiple Pitot and piezometer tube for measuring the flow of water through closed conduits, comprising a cross frame mounted in a fixed position within a conduit; Pitot tube nozzles placed in equal segment areas in the cross frame and having their axes parallel the axis of the conduit; transparent tubes arranged in vertical series and lying in one plane mounted exteriorly of the conduit; a manifold disposed upon the free ends of the transparent tubes and adapted to the admission of a compressible fluid therein for depressing a liquid admitted to said tubes through their lower ends to normal working position; and pipes connecting said Pitot tubes with the lower ends of said transparent tubes.

4. A multiple Pitot and piezometer tube for measuring the flow of water through closed conduits, comprising Pitot tube nozzles placed in representative areas within a conduit and having their axes parallel the axis of the conduit; piezometer tubes passed through the conduit wall in approximately the same cross section; transparent tubes vertically mounted upon the exterior of the conduit; a cushion head mounted at the upper ends of said transparent tubes and communicating therewith; means connecting the individual Pitot and piezometer tubes to the lower ends of the individual transparent tubes; means provided for the introduction under pressure of a compressible fluid into the cushion head for depressing the liquid in said tubes to normal working position; and a graduated chart positioned behind said transparent tubes.

5. A multiple Pitot and piezometer tube for measuring the flow of water through closed conduits, comprising a frame support disposed within a conduit, a plurality of Pitot tubes disposed within said frame support and having their axes parallel with the axis of the conduit, a plurality of glass tubes vertically disposed exterior of the conduit, a manifold mounted on the upper end of said tubes, a pet cock secured to the lower end of each of said tubes, means on said manifold to admit a compressible fluid under pressure therein for depressing the liquid in said tubes to a normal working position, and pipes connecting individual Pitot tubes with the pet cock of the individual glass tubes.

6. A multiple Pitot and piezometer tube for measuring the flow of water through closed conduits, comprising a frame support disposed within a conduit, a plurality of Pitot tubes disposed within said frame support and having their axes parallel with the axis of the conduit, a plurality of glass tubes vertically disposed exterior of the conduit, a manifold mounted on the upper end of said tubes, a pet cock secured to the lower end of each of said tubes, means on said manifold to admit a compressible fluid under pressure therein for depressing the liquid in said tubes to a normal working position, piezometer tubes disposed about said conduit, and pipes connecting the individual Pitot tubes and piezometer tubes with the pet cock of the individual glass tubes.

7. A multiple Pitot and piezometer tube for measuring the flow of water through closed conduits, comprising a frame support mounted within a conduit, a plurality of Pitot tubes mounted within said frame support and having their axes parallel with the axis of the conduit, a supporting frame mounted exterior of said conduit, a plurality of glass tubes vertically and parallelly mounted on said supporting frame, a manifold on the upper ends of said tubes, means on said manifold for admitting a compressible fluid under pressure therein for depressing the liquid in said tubes to a normal working position, a pet cock secured to the lower end of each of said tubes, piezometer tubes disposed through the wall of said conduit, and pipes connecting individual Pitot tubes and piezometer tubes with the pet cock of the individual glass tubes.

DELBERT W. PROEBSTEL.